April 23, 1929.  G. GILLIAM  1,709,847
FRUIT PICKING DEVICE
Filed March 17, 1927
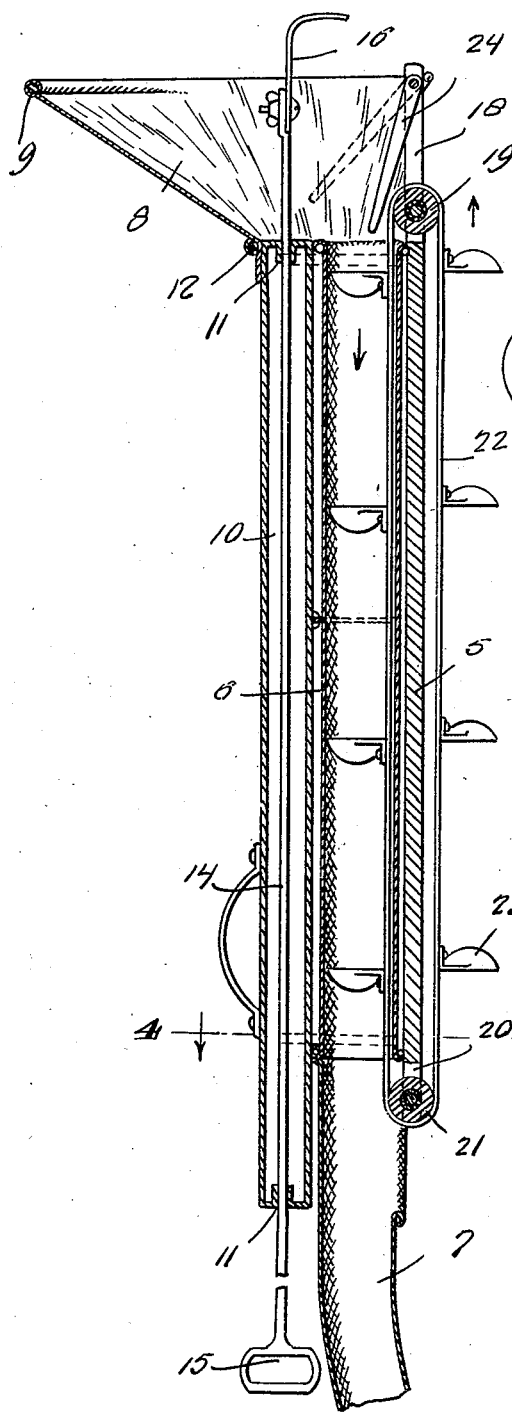
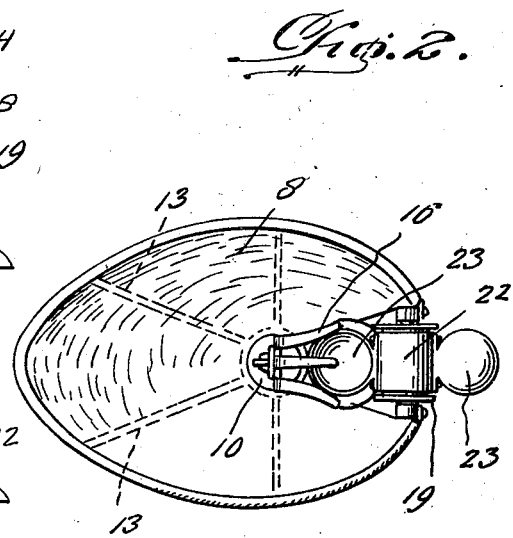
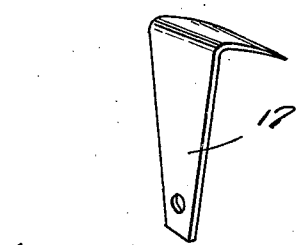
Inventor
Garfield Gilliam,
By Clarence A. O'Brien
Attorney Patented Apr. 23, 1929.

1,709,847

UNITED STATES PATENT OFFICE.

GARFIELD GILLIAM, OF GARRICH, KENTUCKY.

FRUIT-PICKING DEVICE.

Application filed March 17, 1927. Serial No. 176,064.

This invention relates to new and useful improvements in fruit picking devices and has for its primary object to provide means whereby fruit may be properly picked from a tree and this without requiring the climbing of the tree, the invention consisting generally of means of a relatively elongated nature whereby one may reach the fruit and pull the same from the branches, after which the fruit will drop into the device and be conveyed downwardly to a basket or other receptacle.

A further object of this invention is to provide a fruit picking device wherein the fruit after being pulled from the tree will pass into a conveying tube through which is movable means for retarding the speed of the fruit passing therethrough with the end in view that the same will not drop into the basket or other receptacle with great force which would of course result in the bruising or other damage to the fruit.

A further and important object is to provide a fruit picking device of this character that is of relatively simple construction and inexpensive to manufacture and one that may be operated by inexperienced persons in the proper picking of fruit.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views:

Figure 1 is a detail longitudinal section through my improved fruit picking device.

Figure 2 is a top plan view thereof.

Figure 3 is a perspective of a modified form of fruit picking member, and

Figure 4 is a transverse section taken substantially on the line 4—4 of Figure 1.

Now having particular reference to the drawing my novel device consists of a relatively elongated narrow strip of rigid material 5, preferably wood upon the inner face of which is suitably arranged a fruit conveying tube 6 of fabric or other suitable material, the lower end of this tube having communication with an additional length of tubing 7 also of fabric or other suitable material, and of predetermined length, the free end of which is preferably disposed within a fruit crate, basket or other suitable receptacle.

The upper end of the tube 6 merges into a flaring fruit receiving mouth, the edge of which is provided with a reinforcing wire 9. Arranged within the bottom of this mouth 8 is a depending elongated metallic tube 10 closed at its opposite ends and being provided at said ends with registering openings 11—11. The material forming the mouth 8 upon the upper end of the flexible tube 6 is preferably clamped around the said tube 10 by a wire 12 which wire is suitably connected to the wire 9 of the mouth 8 by bracing wires 13—13 to prevent the collapsing of said mouth. The upper ends of the tubes 6 and 10 are held alongside of each other and to the strip 5 by the knob 8 and the lower portions of these tubes are held alongside of each other and alongside the strip by means of suitable means 30.

Loosely movable through the metallic tube 10 is a rod 14, the lower end of which is equipped with a suitable handle 15, while detachably associated with the upper end thereof is a fruit picking fork 16, as in Figures 1 and 2, or a fruit stem cutting blade 17 disclosed in Figure 3.

The upper end of the rigid material strip 5 is slotted as at 18, while rotatably mounted within this slot adjacent the lower end thereof is a roller 19. The lower end of said rigid material strip 5 is also slotted as at 20, while rotatably mounted therein is a roller 21. Trained over these rollers 19 and 21 is an endless strip of flexible material 22, the inner run of which is arranged within the fruit conveying tube 6, said strip of flexible material being equipped with fruit receiving cups 23 arranged in predetermined spaced relation throughout the entire area of said endless strip as in Figure 1.

Obviously as the fruit is pulled from the tree by reason of the fork 16 or blade 17 which after engagement with the fruit is pulled downwardly by drawing upon the rod handle 15 said fruit will drop into the mouth 8 and by reason thereof be conveyed to the tube 6. Obviously the fruit will drop within the upper cup 23 within said tube 6 and by reason of its weight will cause the movement of the cup carrying belt with the end that the fruit will move slowly downwardly within this tube 6 and be deposited in the tube 7 from whence it is conveyed to the crate, basket, or other receptacle.

As disclosed in Figure 1, the upper end of the rigid material strip 5 extends to the upper edge of the mouth 8 of the tube 6, and in order to prevent the passage of the fruit through the slot 18 at the upper end of said strip 5 there is pivotally disposed within the upper end of the slot a depending finger 24, the lower end of which terminates at the inner side of the upper roller 19. By reason of the pivotal connection of the finger within the upper end of the slot 18 said finger may be forcibly moved inwardly when engaged by the cups 23 passing through the slot 18.

It will thus be seen that I have provided a highly novel, simple and inexpensive fruit picking device that is well adapted for all the purposes heretofore designated and even though I have herein shown and described the invention as consisting of certain detail structural elements it is nevertheless to be understood that some changes may be made therein without affecting the spirit and scope of the appended claims.

Having thus described the invention, what I claim is:

1. In a fruit picking device of the character described, an elongated fruit delivery tube having a receiving mouth upon its upper end, a rigid backing strip arranged at one side of the tube, the ends thereof extending beyond the ends of the tube, and being slotted at said ends, rollers mounted loosely within the slots of the backing strip, an endless belt arranged around said rollers, the inner run thereof being arranged in the fruit delivery tube, fruit receiving cups arranged in spaced relation throughout the entire length of the strip for receiving the fruit as the same passes from the mouth into the fruit delivery tube, means within the slot at the upper end of the backing strip to prevent the fruit from passing therethrough above the uppermost endless belt roller and manually operable means for pulling the fruit from the tree, said means being operable within the fruit delivery tube mouth.

2. In a fruit picking device of the character described, an elongated fruit delivery tube having a receiving mouth upon its upper end, a rigid backing strip arranged at one side of the tube, the ends thereof extending beyond the ends of the tube, and being slotted at said ends, rollers mounted loosely within the slots of the backing strip, an endless belt arranged around said rollers, the inner run thereof being arranged in the fruit delivery tube, fruit receiving cups arranged in spaced relation throughout the entire length of the strip for receiving the fruit as the same passes from the mouth into the fruit delivery tube, means within the slot at the upper end of the backing strip to prevent the fruit from passing therethrough above the uppermost endless belt roller and manually operable means for pulling the fruit from the tree, said means being operable within the fruit delivery tube mouth, said means consisting of an elongated tube fixed at the opposite side of the fruit delivery tube, an elongated rod slidable through said tube and adapted to be manually operated and a fruit pulling unit arranged upon the upper end of the rod within the fruit delivery tube mouth.

3. In a fruit picking device of the character described, a relatively elongated fruit delivery tube having a flared mouth upon its upper end, a backing strip for the tube terminating at its lower end beneath said tube and at its upper end at the upper edge of said tube flared mouth, the opposite ends of said backing strip being slotted, endless belt rollers mounted within the slots of the backing strip, the roller within the slot at the upper end of the backing strip being positioned directly adjacent the upper end of the fruit delivery tube, a pivotally mounted finger arranged within the slot at the upper end of the strip above said roller, the lower end thereof terminating at the inner side of said upper roller, an endless belt trained over the rollers, the inner run thereof being arranged within the fruit delivery tube, fruit receiving cups arranged in spaced relation throughout the length of the belt for engagement within the fruit delivery tube and adapted to receive the fruit as the same falls into the tube from the said flared mouth, and means operable within the mouth of the delivery tube for pulling the fruit from the tree.

4. A fruit picking device of the class described comprising an elongated fruit delivery tube, a receiving mouth upon its upper end, a rigid mounting strip arranged alongside of the tube, the ends thereof extending beyond the ends of the tube and being slotted, rollers journaled in the slots, an endless belt arranged around said rollers, the inner run of the endless belt being arranged in the fruit delivery tube, fruit receiving cups arranged in spaced relation throughout the length of the strips for receiving the fruit as the same passes from the mouth into the delivery tube, a pivotally mounted finger arranged within the slot at the upper end of the strip above the upper roller, the lower free end of said finger terminating in the mouth and positioned to be swung inwardly by the cups and acting to prevent the fruit from escaping through the upper slot.

In testimony whereof I affix my signature.

GARFIELD GILLIAM.